United States Patent [19]

Cogswell et al.

[11] 4,390,581
[45] Jun. 28, 1983

[54] MOULDING

[75] Inventors: Frederic N. Cogswell; David T. Mitchell, both of Welwyn Garden City, England

[73] Assignee: Imperial Chemical Industries Limited, London, England

[21] Appl. No.: 238,662

[22] Filed: Feb. 26, 1981

Related U.S. Application Data

[60] Division of Ser. No. 24,434, Mar. 23, 1979, Pat. No. 4,327,053, which is a continuation-in-part of Ser. No. 831,668, Sep. 8, 1977, abandoned.

[30] Foreign Application Priority Data

Aug. 23, 1977 [GB] United Kingdom ............... 35263/77
Mar. 23, 1978 [GB] United Kingdom ............... 11677/78

[51] Int. Cl.³ .......................... B29D 7/02; B32B 3/14
[52] U.S. Cl. ..................................... 428/71; 264/515; 264/173
[58] Field of Search ...................... 264/524, 573, 46.4, 264/167, 173, 171, 46.1; 428/71

[56] References Cited

U.S. PATENT DOCUMENTS

| | | | |
|---|---|---|---|
| 2,728,702 | 12/1955 | Simon et al. | 264/46.6 |
| 2,910,730 | 11/1959 | Risch | 264/46.6 |
| 3,226,285 | 12/1965 | Iovenko | 264/173 |
| 3,286,004 | 11/1966 | Hill et al. | 264/46.6 |
| 3,461,197 | 8/1969 | Lemelson | 264/172 |
| 3,503,841 | 3/1970 | Sterrett | 264/211 |
| 3,550,203 | 12/1970 | Lemelson | 264/171 |
| 3,557,265 | 1/1971 | Chisholm et al. | 264/171 |
| 3,636,151 | 1/1972 | Nagai | 264/89 |
| 3,642,076 | 2/1972 | Buckley et al. | 264/211 |
| 3,661,837 | 5/1972 | Cadas et al. | 260/37 N |
| 3,668,288 | 6/1972 | Takahashi | 264/173 |
| 3,736,201 | 5/1973 | Teraoka | 156/145 |
| 3,751,109 | 8/1973 | Dufton | 297/445 |
| 3,758,354 | 9/1973 | Sakurai et al. | 264/173 |
| 3,775,239 | 11/1973 | Snow | 264/171 |
| 3,791,912 | 2/1974 | Allard | 52/309 |
| 3,801,429 | 4/1974 | Schuenk et al. | 264/171 |
| 3,823,211 | 7/1974 | Colombo | 264/173 |
| 3,840,418 | 10/1974 | Sabee | 264/167 |
| 3,980,744 | 9/1976 | Cogswell | 264/174 |

FOREIGN PATENT DOCUMENTS

| | | |
|---|---|---|
| 30496 | 6/1981 | European Pat. Off. . |
| 1147029 | 4/1963 | Fed. Rep. of Germany . |
| 1228789 | 11/1966 | Fed. Rep. of Germany . |
| 1479899 | 5/1969 | Fed. Rep. of Germany . |
| 1901828 | 8/1970 | Fed. Rep. of Germany . |
| 1629543 | 2/1971 | Fed. Rep. of Germany . |
| 2094092 | 6/1970 | France . |
| 2214587 | 1/1973 | France . |
| 1026763 | 4/1966 | United Kingdom . |
| 1439191 | 6/1976 | United Kingdom . |
| 1465736 | 3/1977 | United Kingdom . |

Primary Examiner—Jay H. Woo
Attorney, Agent, or Firm—Cushman, Darby & Cushman

[57] ABSTRACT

Articles are blow moulded from thermoplastic polymeric materials containing high proportions of fillers such as glass fibres. The method comprises extruding the filled polymeric material through a die having a mandrel for constraining the material into a tubular shape; coextruding between the die and the outer surface of the material, a liquid having a freezing temperature lower than that of the material; cooling the liquid and the outer surface of the material during their passage through the die to a temperature below the freezing temperature of the material but above the freezing temperature of the liquid while maintaining the inner surface of the material molten; squeezing the extrudate at suitable intervals to fuse the molten inner surface together and thereby seal discrete lengths; and inflating the sealed lengths to conform to a surrounding mould to produce laminar shapes which are then foamed-filled to give stiff panels.

8 Claims, 3 Drawing Figures

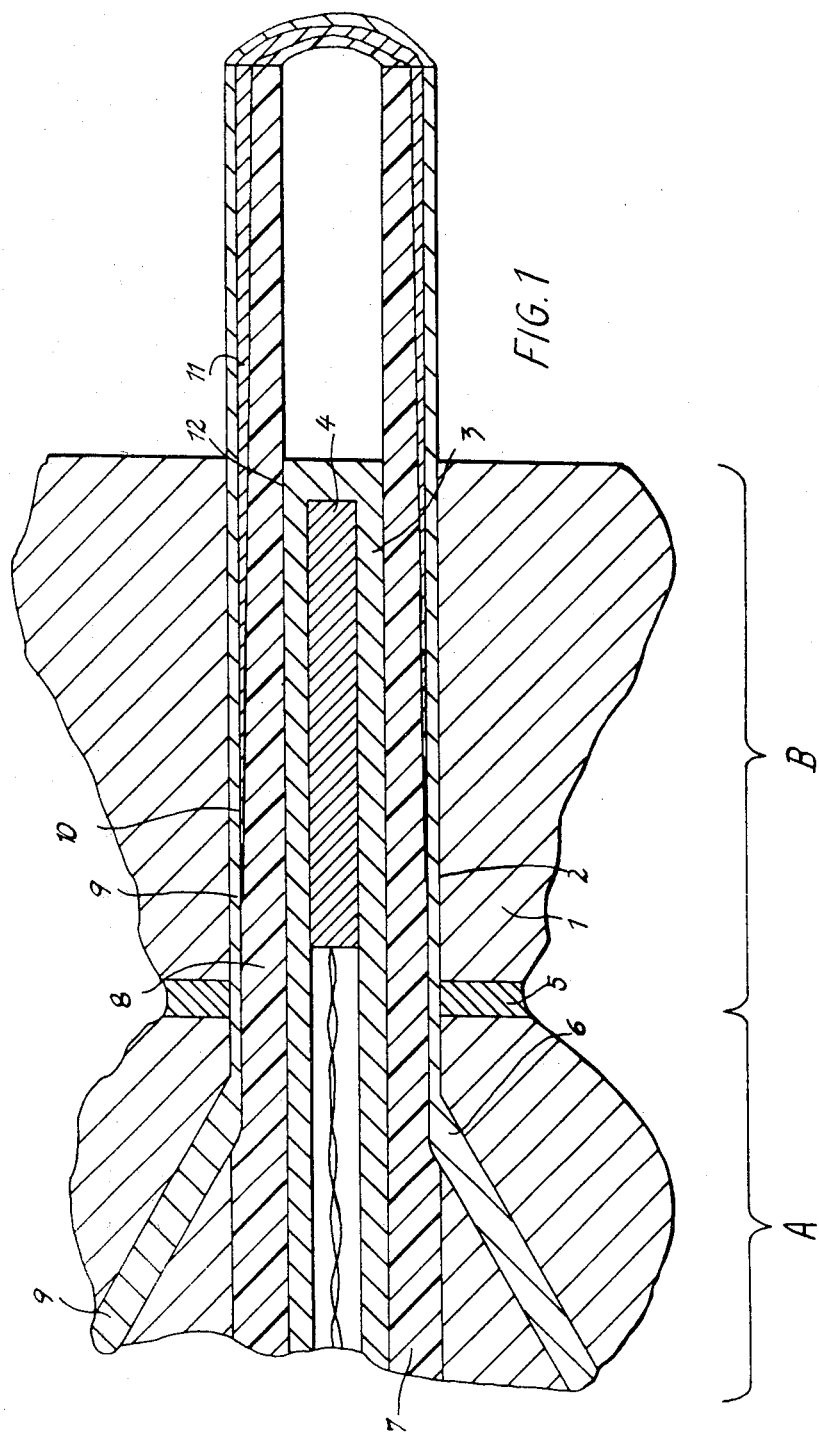

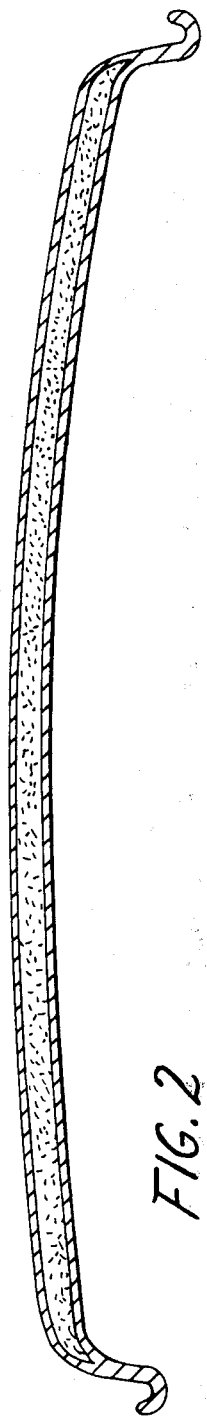
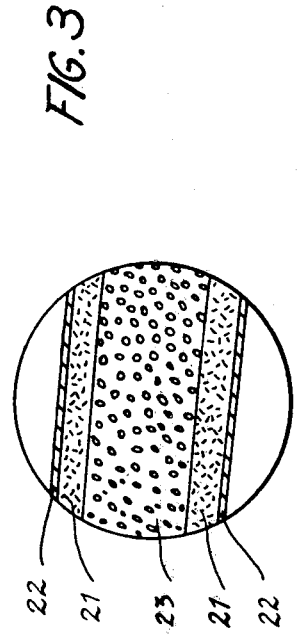

MOULDING

This is a division of application Ser. No. 24,434 filed Mar. 23, 1979, now U.S. Pat. No. 4,327,053, which is a continuation-in-part of application Ser. No. 831,668, filed Sept. 8, 1977 (now abandoned).

The invention relates to a method for producing shaped articles of thermoplastic polymeric materials using blow moulding techniques.

When articles are formed from thermoplastic materials the properties of the material may be modified by dispersing a suitable filler throughout the material. Thus, for example, bulky fillers, such as hollow siliceous microspheres or cheap fillers such as talc or mineral limestone, may be introduced to reduce material costs or a fibrous filler may be added to improve physical properties such as rigidity, tensile yield stress, impact strength and heat distortion temperature. Most effective compositions generally have ratios of filler to thermoplastic material in the range of from 2:8 to 4:6 by weight, the precise optimum proportions depending on the actual filler used and the effect desired. However, compositions containing such high quantities of fibrous filler have not previously been suitable for fabrication by blow moulding techniques.

Blow moulding processes involve an initial step of providing a hollow preform which is then inflated to conform to the shape of a surrounding mould, and it is this inflation step where problems occur with highly filled materials. Thus, unless much thicker sections are used (compared with unfilled compositions), there is a tendency for the stiffer preforms of filled materials to split on inflation, especially along the direction of filler orientation on preforms extruded from compositions having high proportions of fibrous fillers. Thus, for example, when using inflation ratios of 3:1, the practical upper limit for glass fibre fillers is generally around 8% by weight of the composition, whereas at least 15% is generally required for obtaining significant improvements in physical properties.

In our U.S. Pat. No. 3,980,744, we describe and claim a method for producing hollow articles which comprises extruding a thermoplastic polymeric, material, initially in a molten state, through a die having a mandrel for constraining the material into a tubular shape and producing thereby a tubular extrudate having an outer surface and an inner surface, coextruding between the die and the outer of the polymeric material, a liquid having a freezing temperature lower than that of the polymeric material, cooling the liquid and the outer surface of the polymeric material during their passage through the die, to a temperatue below the freezing temperature of the polymeric material but above the freezing temperature of the liquid, while maintaining the inner surface of the polymeric material molten, squeezing the extrudate at suitable intervals to fuse the molten inner surface together and thereby seal discrete lengths, and inflating the sealed lengths to conform to a surrounding mould to thereby produce the shaped article, (referred to hereinafter as the "method of the kind specified"). In this method, a thin layer of the thermoplastic material is stiffened by the cooling action of the die, and gives support to the tubular preform as it extrudes prior to moulding. This is of particular advantage for supporting large preforms and stiffening very mobile materials, and various examples employing polyolefins, nylons and polycarbonates are described in the aforesaid U.S. patent specification.

We have now found that if the method of the kind specified is applied to a highly filled thermoplastic material, the partial freezing of the preform does not reduce mobility of the thermoplastic material to the point of increasing rupture during inflation, but rather it reduces such tendencies. Accordingly, there is now provided a method of the kind specified for producing shaped articles from thermoplastic polymeric materials, wherein the improvement consists in the dispersion of a filler throughout the thermoplastic material prior to its extrusion as a tubular extrudate, the ratio of filler to thermoplastic material being at least 15:85 by weight.

The maximum ratio of filler to thermoplastic material which can be used depends mainly on the nature of the filler. For example, compositions containing large proportions of anisotropic fillers such as glass fibres, become increasingly difficult to extrude, and for this reason the proportion of anisotropic filler to polymeric material is preferably equal to or less than 4:6 by weight. However, higher proportions of isotropic fillers can be accommodated, e.g. up to a weight ratio of about 7:3, although for most presently known fillers, the ratio of filler to polymeric material is preferably less than 6:4 by weight.

The present method may be used to produce hollow articles having a relatively high volume per unit surface area, examples of such articles including containers such as bottles. For such articles the inflation ratio is usually greater than 2:1 and is preferably greater than 3:1 by volume. However, the present method may also be used to produce articles having a very much lower volume per unit surface area, including in particular double walled articles, i.e. articles having two closely-spaced, substantially parallel walls, which are usually lamina in form and may include trays, car body panels, chairs and other such articles of furniture. For such articles, a much lower inflation ratio, e.g. 1:1, is generally preferred.

Double-walled articles of this kind tend to have only a low resistance to twist, even when containing a high proportion of fibrous filler. However the stiffness of such articles can be improved by moulding in ribs, or by filling the space between the two walls with foam. Thus a preferred method is one which comprises moulding a double-walled article with closely-spaced walls enclosing a volume therebetween, injecting a foamable composition into the enclosed volume and allowing or causing the composition to foam while the article is held within a constraining means constructed to prevent outward displacement of the spaced-apart walls by pressure from the foaming composition. The constraining means is preferably the mould used to shape the article.

In order that the thermoplastic material shall conform accurately to the shape of the mould, the pressure used to inflate the sealed lengths of extrudate during shaping of the article must generally be higher than that which will start to inhibit foaming, even when the inflation ratio is low, e.g. 1:1 or less. It is therefore preferred to cool the mould after inflation of the length of polymeric material to harden the polymeric material sufficiently to retain its moulded shape, and thereafter venting the article thus formed before injecting the foamable material.

The foam is preferably a polyurethane foam for reasons of convenience, the foamable composition comprising a diisocyanate and a diol which react together in situ, and require little ancillary equipment. Polyurethanes based on diphenylmethane diisocyanate (MDI) are generally preferred on account of their rigidity and lower toxicity. Alternative kinds of foams include those which are the product of the agitation with air of a settable fluid, e.g. urea formaldehyde foam, and thermoplastic compositions which can be injected into the article while the thermoplastic is in a molten state, and which contain a blowing agent to form the foam structure before the thermoplastic sets.

The invention is illustrated by the accompanying drawings and by the Examples which follow hereinafter. In the drawings:

FIG. 1 is a schematic foreshortened section through an extruder die during coextrusion of a thermoplastic polymeric material with a surrounding lubricant, and FIGS. 2 and 3 are, respectively a section through a car roof panel and enlarged detail of the portion circled in FIG. 2 to show the structure.

In the Examples:

Example 1 describes the production of a hollow article by the method of the present invention, and Examples 2 and 3 are comparative Examples outside the scope of the invention.

In FIG. 1 of the drawings the apparatus comprises a die 1 having a cylindrical inner surface 2 and a coaxial mandrel 3. Within the mandrel is a cartridge heater 4 and part way along the die is a short annular section of insulation 5 which divides the die into two zones A, B, having separate heat-exchange systems (not shown) substantially isolated by the insulation 5. In zone A is an annular inlet 6 communicating with an axial annular passage 7 formed around the mandrel 3. The die is secured to the outlet of a conventional extruder (not shown). In use, molten thermoplastic material 8 from the extruder is forced along the axial annular passage 7, and lubricant 9 is metered through the annular inlet 6 so as to separate the outer surface 10 of the thermoplastic from the inner surface 2 of the die. Zone A is a hot zone in which the temperature of the die is substantially the temperature of the ingoing molten thermoplastic material, while zone B is cooled to below the freezing temperature of the material (but above the melting point of the lubricant), causing the thermoplastic material to form a stiffer tubular outer region 11 while its inner surface 12 is kept molten by the cartridge heater 4.

EXAMPLE 1

A composition of polypropylene melt (MFI 230° C.=3—the melt flow indices quoted in this Example being carried out at the stated temperature according to BS 2782: Part 1/105C/1970, using a 2.16 Kg load) and glass fibre in the ratio of 8:2 by weight was fed at 210° C. to the illustrated die as the main feed of thermoplastic material 8, and an ethylene/vinyl acetate (EVA) copolymer (containing 28% vinyl acetate and of MFI 190° C.=5) with dispersed metallic pigment was fed as the lubricant 9, the weight ratio of the polypropylene composition to lubricant being 88:12. The die was cooled to about 100° C. and the mandrel maintained at about 210° C. The composition emerged as a tubular extrudate, which was sealed at intervals by squeezing the walls so that the molten inner layer fused. The sealed lengths were then inflated in a mould with an inflation ratio of 3:1 to give flexible containers for holding liquid detergent.

The containers were formed without any rupture occurring on inflation. The external surface quality of the mouldings was dominated by the glossy EVA skin with its silvery metallic pigment, on which the glass fibre reinforced main stream conferred a pleasing grainy texture. X-ray analysis showed that the fibres were primarily aligned along the extrusion direction giving an enhanced modulus, providing inter alia improved stackability.

EXAMPLE 2

The production of containers as described in Example 1 was repeated, but the cooling in the die was omitted. The die temperature was uniformly at the temperature of the extruding polymer, i.e. about 210° C. The containers all emerged in a ruptured state, with failures lying predominantly along longitudinal lines. Adjustment of the conditions (but without reintroducing the cooling of Example 1) failed to produce any successful run of containers.

EXAMPLE 3

The production of containers as described in Example 1 was repeated except that the glass fibre reinforcement was omitted. Good containers were produced with strong welds, the metallic pigment being in the outer EVA layer and hence not affecting the weld in any way. The outer layer of EVA adhered well to the polypropylene but the surface in being smooth was less attractive than that in Example 1. The containers produced in this Example were also noticeably less stiff than those produced in Example 1.

In FIG. 2 of the drawings there is shown a car roof panel as an example of a rigid shaped article which can be manufactured by the present method. The panel is constructed from a glass-filled polypropylene composition 21 comprising about 30% by weight of relatively long glass fibres (e.g. average length around 5 mm). This is surrounded by a layer 22 of EVA to give a surface more acceptable for painting, and the space enclosed by the polypropylene is filled with MDI polyurethane foam 23. For this application the EVA preferably contains less vinyl acetate than that used in Example 1 above. Thus although at least 5% by weight of vinyl acetate is desirable for paint acceptability, more than about 15% by weight of vinyl acetate gives rise to a surface which is generally too soft for this application.

The panel is formed substantially as described in Example 1 above, except that instead of using a mould consisting of two female halves to give a container shape, the mould for the panel consists of a female part and a male part of corresponding shape, and except also that a lower blow ratio of 1:1 instead of 3:1 is used. This gives a double-walled panel with closely-spaced walls enclosing a volume therebetween. After the panel has been shaped, the mould is cooled until the polypropylene is sufficiently hard to support itself against the internal mould surface, and the interior of the panel is then vented. The polyurethane reactants are then injected into the volume enclosed by the walls and allowed to react and form the foam, while the panel remains in the mould. Support from the mould stops the panel being distorted by pressure from the expanding foam.

The high proportion of filler in the polypropylene does increase considerably the strength and stiffness of the panel in comparison with a similar panel of unfilled polypropylene. However, despite the filler, the resistance to twist of the panel in the absence of any foam filling is not good, but is improved very considerably in panels where foam has been introduced as described above. The foam also deadens the structure accoustically.

We claim:

1. A method for producing a shaped article which comprises extruding a thermoplastic polymeric material, initially in a molten state, through a die having a mandrel for constraining the material into a tubular shape and producing thereby a tubular extrudate having an outer surface and an inner surface; coextruding between the die and the outer surface of the polymeric material, a liquid having a freezing temperature lower than that of the polymeric material; cooling the liquid and the outer surface of the polymeric material during their passage through the die, to a temperature below the freezing temperature of the polymeric material but above the freezing temperature of the liquid, while maintaining the inner surface of the polymeric material molten; squeezing the extrudate at suitable intervals to fuse the molten inner surface together and thereby seal discrete lengths; and inflating a sealed length to conform to a surrounding mould, thereby to produce the shaped article, characterised in that the method is applied to a thermoplastic material containing a filler, the ratio of filler to thermoplastic material being at least 15:85 by weight, and that the sealed length of extrudate is moulded into an article with two closely-spaced substantially parallel walls enclosing a volume therebetween, a foamable composition is injected into the enclosed volume and the composition is allowed or caused to foam while the article is held within a constraining means constructed to prevent outward displacement of the spaced-apart walls by pressure from the foaming composition.

2. A method according to claim 1 in which the filler is anisotropic and the ratio of filler to polymeric material is equal to or less than 4:6 by weight.

3. A method according to claim 2 in which the filler consists essentially of glass fibres.

4. A method according to claim 1 in which the filler is substantially isotropic, and in which the ratio of filler to polymeric material is less than 6:4 by weight.

5. A method according to claim 1 in which the constraining means is the mould used to shape the articles.

6. A method according to claim 1 which comprises inflating a length of polymeric material to conform to the shape of the mould, cooling the mould to harden the extrudate sufficiently to retain its moulded shape and thereafter venting the double-walled article thus formed before injecting the foamable material.

7. A method according to claim 1 characterised in that the foamable composition comprises a diisocyanate and a diol which react together to give a polyurethane foam.

8. A car body panel comprising two closely-spaced substantially parallel walls enclosing a volume therebetween which is filled with foam, made by a method according to claim 1, in which each wall comprises a layer of thermoplastic material containing filler surrounded by a layer of a different thermoplastic material of which the freezing temperature of the outer thermoplastic material is lower than that of the filled thermoplastic material.

* * * * *